United States Patent
Stancill

(10) Patent No.: US 6,955,203 B2
(45) Date of Patent: Oct. 18, 2005

(54) BEAD BREAKER

(76) Inventor: Timothy Stancill, 1327 Old Fallston Rd., Fallston, MD (US) 21047

(*) Notice: Subject to any disclaimer, the term of this patent is extended or adjusted under 35 U.S.C. 154(b) by 0 days.

(21) Appl. No.: 10/817,758

(22) Filed: Apr. 2, 2004

(65) Prior Publication Data
US 2004/0216848 A1 Nov. 4, 2004

Related U.S. Application Data
(60) Provisional application No. 60/459,942, filed on Apr. 2, 2003.

(51) Int. Cl.[7] .............................................. B60C 25/02
(52) U.S. Cl. ........................................ 157/1.3; 157/1.17
(58) Field of Search ........................ 157/1.3; 254/104; 29/239; 294/49; 30/167, 168, 308; 7/100; 144/195.5, 195.7, 195.8; D8/10, 31, 98, 105; 81/3.55, 15.2, 436

(56) References Cited

U.S. PATENT DOCUMENTS

| | | | | |
|---|---|---|---|---|
| 1,689,585 A | * | 10/1928 | Haschart | 81/125.1 |
| 1,969,807 A | * | 8/1934 | Leonard | 157/1.17 |
| 3,861,525 A | * | 1/1975 | Collin | 206/320 |
| 3,897,812 A | * | 8/1975 | Arnn | 81/436 |
| 5,875,515 A | * | 3/1999 | Dallas | 15/236.05 |
| 6,527,033 B1 | * | 3/2003 | Kliskey | 157/1.3 |
| 6,564,849 B1 | * | 5/2003 | Kusner | 157/1.3 |
| 6,769,182 B1 | * | 8/2004 | Mc Cabe | 30/164.6 |
| 2003/0136567 A1 | * | 7/2003 | Wherry | 172/371 |

FOREIGN PATENT DOCUMENTS

CH       677485 A5 * 5/1991 .............. B67B/7/00

* cited by examiner

Primary Examiner—David B. Thomas
(74) Attorney, Agent, or Firm—Law Office of Royal W. Craig

(57) ABSTRACT

A hand held tool for loosening or breaking the beads of tubeless pneumatic tires from wheel rims. When removing a tire from a wheel rim, lateral displacement of the tire bead from the indented rim is required. This lateral displacement of the bead of the tire is known as "breaking the bead". The present device is a wedge-shaped bead breaking device to be inserted between a tire and wheel rim to break the bead of the tire. The device is molded plastic with a rugged handle joined to a broad wedge-shaped member. The wedge is molded with three or more parallel reinforcing runners with interspacing grooves between. The runners increase the strength of the wedge and reduce friction upon insertion of wedge between wheel rim and tire. The grooves provide an outlet channel for air escaping the tire and reduce the amount of plastic needed for molding the device.

9 Claims, 4 Drawing Sheets

BEAD BREAKER

CROSS-REFERENCE TO RELATED APPLICATIONS

The present application derives priority from U.S. Provisional Patent Application No. 60/459,942 for "BEAD BREAKER"; Filed: Apr. 2, 2003.

BACKGROUND OF THE INVENTION

1. Field of the Invention

The present invention relates to tire changing implements for assisting in the removal of tires and, more particularly, to a hand-held bead breaking device that allows the user to quickly and easily break the bead of larger tubeless pneumatic tires such as those found on motorcycles, cars and trucks.

2. Description of the Background

Tubeless pneumatic tires include two beads or bead bundles on either side of the wheel rim. A bead is typically a ring of high-strength cable coated with rubber which gives the tire strength to stay seated on the wheel rim and support when being installed on the wheel rim. In order to remove a tire from a wheel rim the user must laterally displace the tire bead over the step on the inside of the rim, commonly referred to as "breaking the bead". Breaking the bead is done so that the tire can be moved into the smaller diameter center of the rim making it easier to remove. Breaking the bead is especially difficult on larger tires such as those found on motorcycles, cars and trucks.

There have been a number of prior efforts to provide tools for "breaking the bead".

For example, U.S. Pat. No. 6,170,361 to Yates issued Jan. 9, 2001 shows an all-in-one tool which contains various implements for use in tubeless tire repair.

U.S. Pat. No. 5,806,578 to Gonzaga issued Sep. 15, 1998 shows a manual tire bead breaking lever which is tantamount to a crow bar.

U.S. Pat. No. 5,152,330 to Heise issued Oct. 6, 1992 shows a portable and relatively complex device for breaking the bead of a rubber tire from a wheel rim.

U.S. Pat. No. 4,655,271 to Gamez issued Apr. 7, 1987 shows an adjustable screw and frame device for breaking the bead of tires.

U.S. Pat. No. 4,768,572 to Newburgh issued Sep. 6, 1988 shows a mechanical device for breaking beads of pneumatic tires which includes a pair of jaw members, one of which is leveraged to break the bead of the tire held there between.

Most of the above devices are cumbersome and overly complicated apparatuses that are difficult to transport, expensive and difficult to operate. Even the smaller of the above-referenced devices are heavy metal and unwieldy, and they fail to provide the appropriate broad-wedge force to break the beads on truck or heavy duty construction equipment.

Although all of the above-referenced patents are generally directed to tire repair, they do not teach or suggest a simple, light-weight manual bead breaking implement with a broad, flat, rugged and resilient wedge for quickly, easily and safely breaking the bead of larger tubeless tires such as found on motorcycles, cars and trucks. It would be greatly advantageous to provide such a device that can be carried in one's pocket and quickly deployed for breaking the bead of larger tubeless tires, thereby facilitating removal of the tire safely and efficiently.

SUMMARY OF THE INVENTION

It is, therefore, an object of the present invention to provide a hand-operated implement for breaking the bead of tubeless pneumatic tires that is highly portable and constructed of a strong lightweight molded vinyl plastic or like material.

It is another object to provide a bead-breaking implement as described above that is simple and portable, and that wields a broad, flat, rugged, resilient and structurally reinforced wedge for quickly, easily and safely breaking the bead of larger tubeless tires such as found on motorcycles, cars and trucks.

It is another object to provide a design for a bead-breaking implement having a broad, flat, rugged and resilient wedge as described above, which can be economically manufactured by plastic molding and yet which exhibits extreme strength and durability characteristics to withstand its leveraged application and the resistance normally experienced in breaking the bead, thereby facilitating quick, easy and safe removal of a tire.

According to the present invention, the above-described and other objects are accomplished by providing an improved device for breaking the bead of a tubeless pneumatic tire. The device includes a hand grip and integrally-formed wedge member molded of vinyl plastic or the like. The wedge member extends outward to a distal edge and is formed with a plurality of alternating runners and grooves spaced evenly across the wedge member. The runners and grooves are oriented lengthwise from the hand grip to proximate the distal edge of the wedge member. The runners provide structural reinforcement and a low-friction bearing surfaces to reduce friction upon insertion of the wedge between the tire and wheel rim. The device is strong, durable and easily withstands the resistance normally experienced by leveraged application to the bead of the tire against the wheel rim when breaking the bead. Thus, the device facilitates quick, easy and safe removal of a tubeless tire from a wheel rim.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a tool for laterally displacing or "breaking" the beads of tubeless pneumatic tires from the rims of the wheels in order to facilitate removing the tire from the wheel rim. More particularly, the present device is a hand-held bead-breaking implement that is simple, lightweight, extremely durable, and portable. The device features a handle and a molded broad, flat, rugged, resilient and structurally-reinforced wedge for quickly, easily and safely breaking the bead of larger tubeless tires such as found on motorcycles, cars and trucks.

Figure 1:
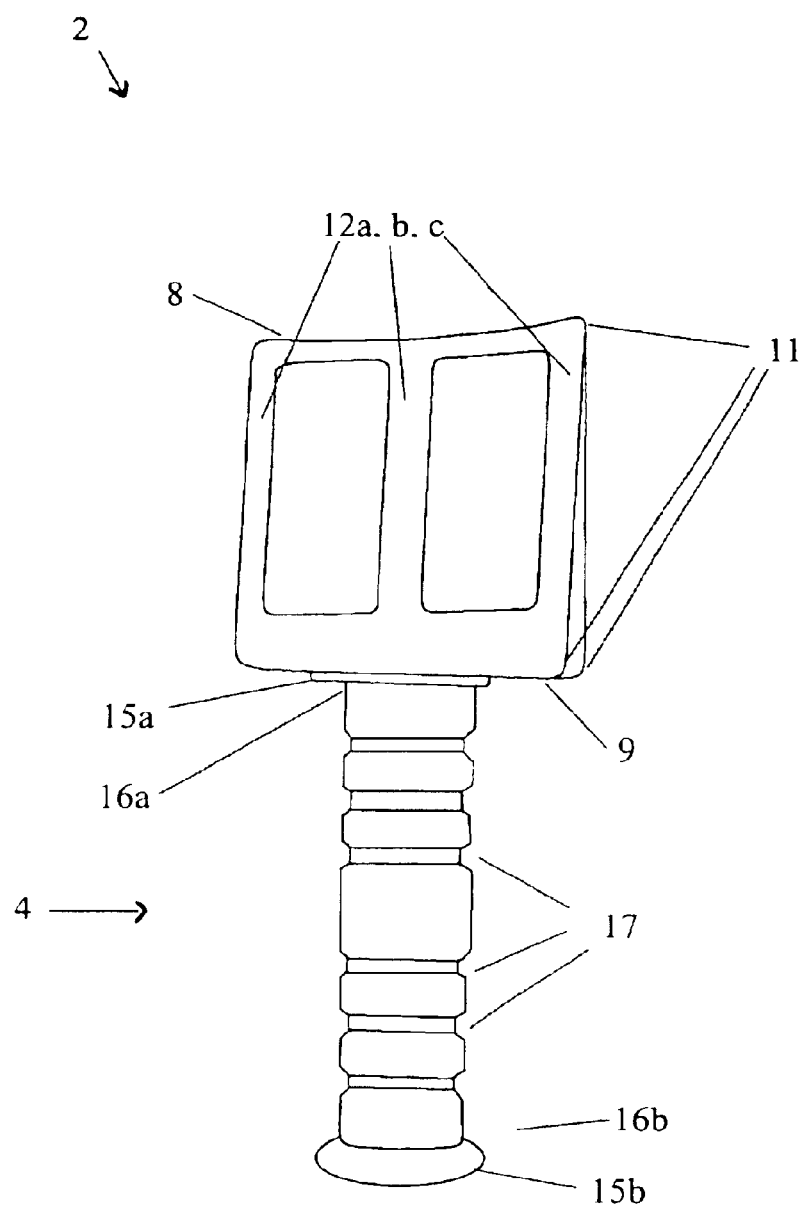
FIG. 1 is a perspective side view of a hand-held bead breaking device according to the present invention that is capable of quickly and easily breaking the bead of larger tubeless tires such as found on motorcycles, cars and trucks.
Figure 2:
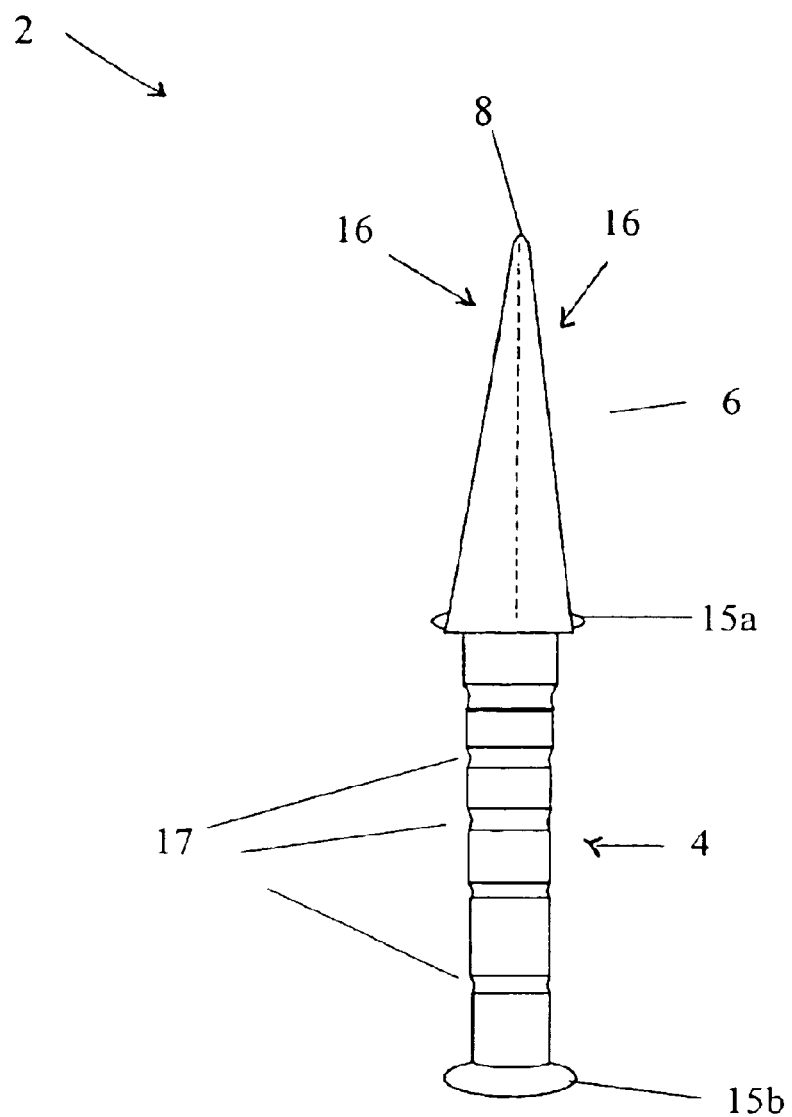
FIG. 2 is a side view of the hand-held bead breaking device of FIG. 1.

FIG. 1 is a perspective side view of the hand-held bead breaking implement 2 according to the preferred embodiment of the present invention. FIG. 2 is a side view, and FIG. 3 is an end view, respectively, of the hand-held bead breaking implement 2 as in FIG. 1.

Figure 3:
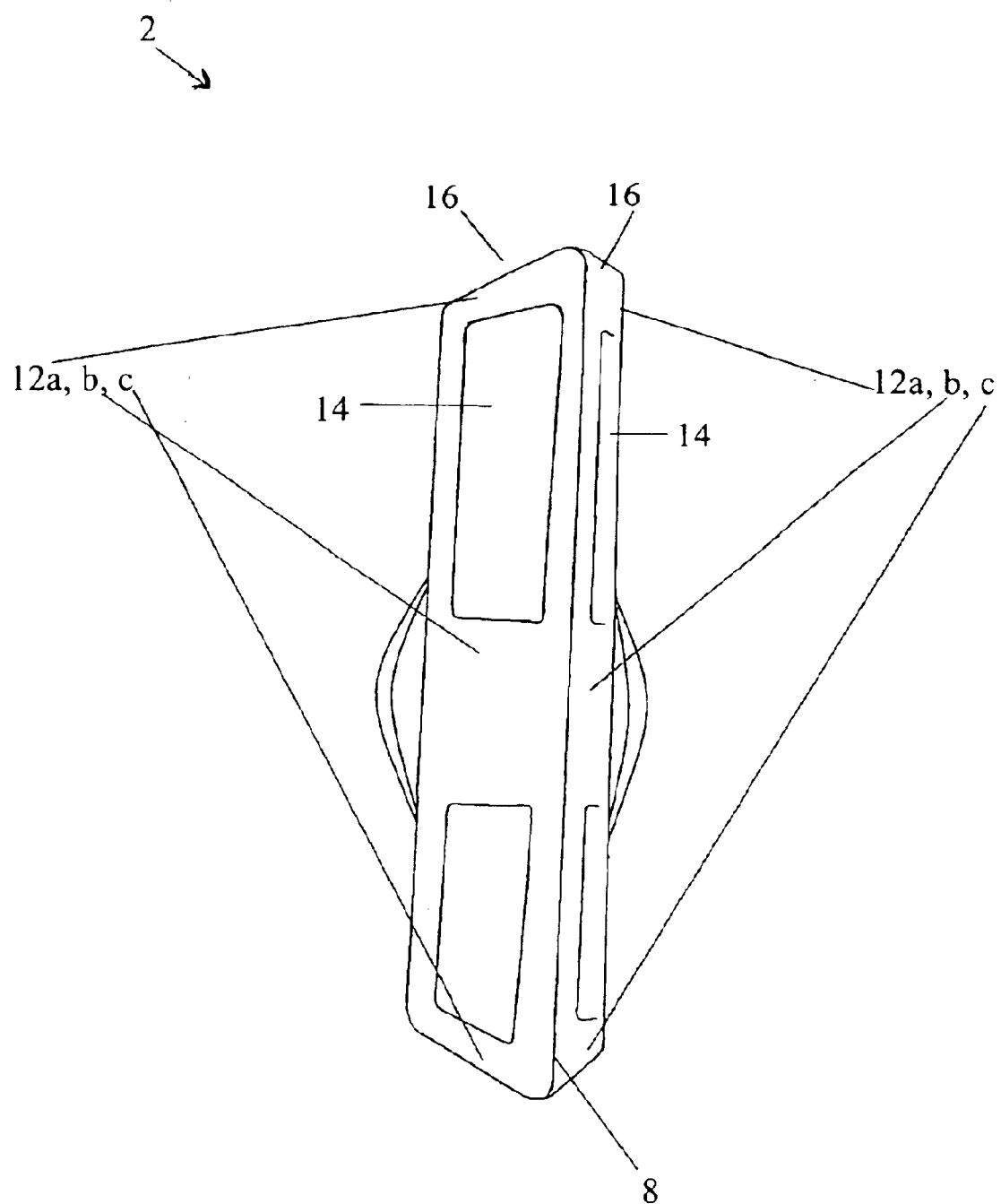
FIG. 3 is a top view of the hand-held bead breaking device of FIGS. 1.

Referring to FIGS. 1–3 combined, the bead breaking implement 2 generally is constructed of solid poly vinyl plastic and comprises a ribbed hand grip 4 integrally joined with the proximal rectangular end 9 of a broad, flat wedge member 6. The grip 4 and wedge member 6 are joined either as separate pieces or are attached by some means (i.e. a male threaded component on the grip 4 and a female threaded component on the end 9 of the wedge member 6 (not shown)) or molded together as a single unit. The hand grip 4 has a distal 16b and proximal 16a end. The hand grip 4 further comprised of fixed first and second hand plates 15a and 15b. The first hand plate 15a positioned on the proximal end 16a adjacent said wedge member 6 and said second hand plate 15b positioned at the distal end 16b. The hand plates 15a and 15b are for preventing the user's hand from sliding off the hand grip 4 during use. The hand grip 4 is further comprised of a textured surface (i.e. ribs or molded grooves 17) to prevent slipping during use.

The wedge member 6 is preferably an approximately 3" square solid wedge terminating at a slightly concave distal edge 8. For safety reasons, the corners 11 of distal edge 8 and proximal rectangular end 9 are preferably rounded (rather than sharp) to prevent injury to the user or the tire. The wedge member 6 is further comprised two symmetrical opposing working surfaces 21 each with a plurality of alternating parallel reinforcing runners (12a–c) and interspacing grooves 14 extending from the proximal end 9 to the distal edge 8. In the preferred embodiment each symmetrical working surface 21 is comprised of at least two runners 12a and 12c extending along the lateral edges of the wedge member 6 (lateral runners), one or more center runners 12b and an interspacing groove 14 between each runner 12a–c. However, those skilled in the art will appreciate that the requisite reinforcement can be achieved with a plurality of runners and interspacing grooves.

The runners 12a–c may be formed by molding interspacing grooves 14 into the wedge member 6. When the device is a solid molding, the grooves 14 reduce the amount of plastic needed for the mold and contribute weight savings and manufacturing economy. Alternatively, the runners 12a–c may molded as a raised surface above the wedge member 6 with the height of the molded runners 12 gradually reduced commensurate with the slope of the wedge member 6 until they fade into the wedge member 6 just short of the edge 8. The raised runners thus form the interspacing grooves 14. Regardless of how the wedge member 6 is molded, the runners 12 follow the slope of the wedge 6 fading into the distal edge 8 such that the distal edge 8 comprises a flat straight smooth continuous surface. In addition to providing reinforcing strength to the wedge member 6, the runners 12a–c provide a bearing surface that reduces friction upon insertion, thereby facilitating breaking of the bead.

In accordance with the present invention, the design is especially suited for vinyl plastic molding for its superior toughness, and the molding can be accomplished by injection or casting. While vinyl plastic has inherent strength limitations when compared to steel, and the present design is structurally reinforced to overcome such limitations.

Figure 4:
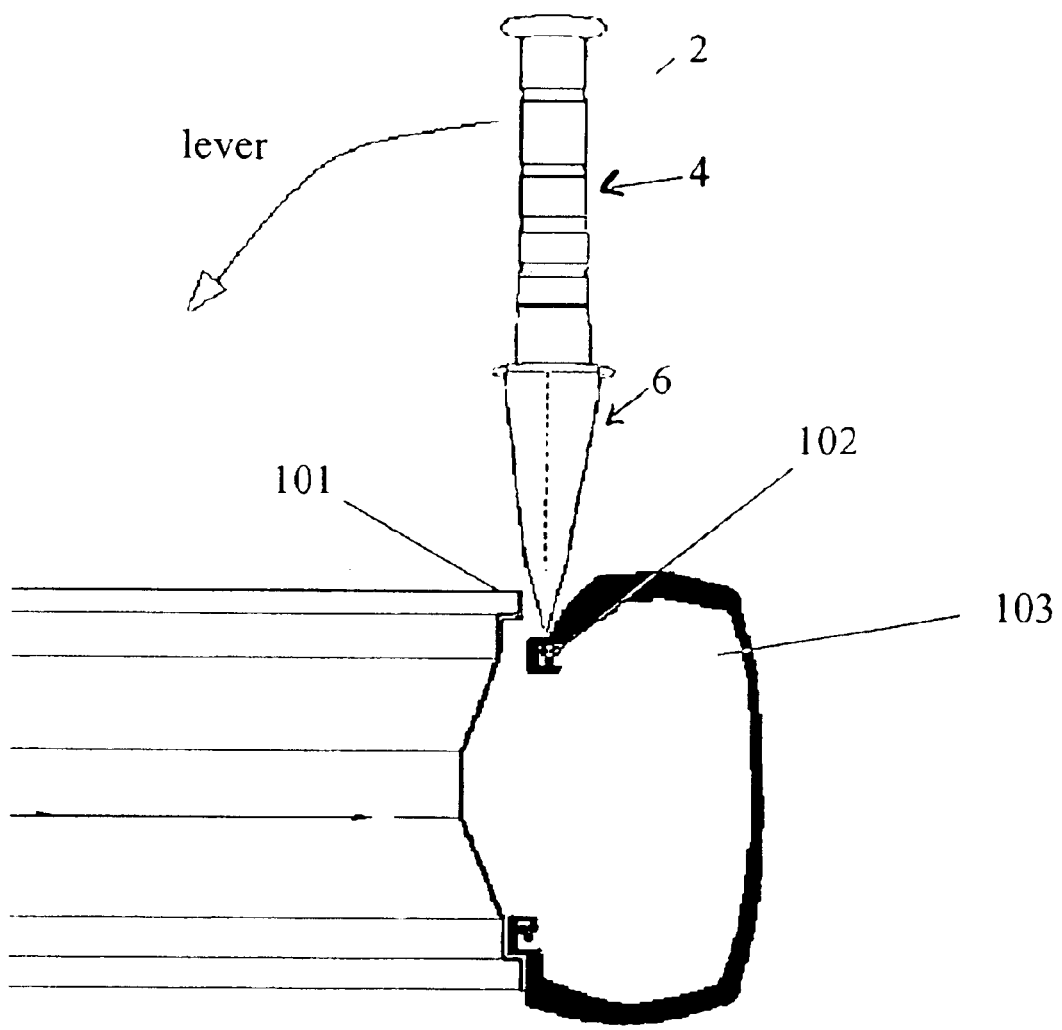
FIG. 4 is an illustration of the hand-held bead breaking device of FIG. 1 in use.

FIG. 4 is an illustration of the device 2 of the present invention in use. In use, the distal edge 8 of the wedge member 6 is inserted between a wheel's rim 101 and a tire 103 (having a bead 102). The combination of low-friction vinyl plastic construction and the presence of runners 12a–c provides low-friction bearing surfaces. Thus, insertion of the wedge member 6 between the wheel rim 101 and the tire 103 until it is fully wedged is facilitated because friction is greatly reduced. Once the device 2 is wedged, the hand grip 4 is pushed towards the wheel leveraging the wedge member 6 against the wheel rim 101 and a nominal amount of manual force is necessary to laterally displace (break) the bead 102. The tire 103 immediately deflates. The interspaced pockets 14 between the runners 12a–c act as channel-outlets allowing the free escape of pressurized air from the tire 103 and avoiding blow-back of the device 2. When the tire 103 is flat, it can be removed by further levering of the hand grip 4 and laterally displacing the bead 102 by working the device 360 degrees around the wheel rim 101, thereby separating the tire 103 from the rim 101.

The device 2 is simple and portable, and can be carried in a pocket. Moreover, the broad, flat, rugged, resilient and reinforced wedge member quickly, easily and safely breaks the bead of most tubeless tires such as found on motorcycles, cars and trucks. The design is especially suited for economical manufacturing by vinyl plastic molding, and yet it exhibits extreme strength and durability to withstand its leveraged application against a high degree of resistance.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept.

It is to be understood, therefore, that the invention may be practiced otherwise than as specifically set forth in the appended claims.

What is claimed is:

1. A device for breaking the bead of a tubeless tire installed on a wheel, comprising:
    a hand grip;
    a wedge member comprising a proximal end having a substantially rectangular cross-section and attached to said hand grip, opposing working surfaces tapered from said proximal end to a distal edge, and a plurality of runners formed in said working surfaces and extending between said distal and proximal ends, wherein said wedge member further comprises a plurality of alternating parallel runners and grooves extending along each of the working surfaces of said wedge member from the proximal end to the distal edge; said runners for reinforcement of said wedge member and for providing low-friction bearing surfaces, and said grooves for providing a channel-outlets for the free escape of air from the tire;
    whereby said wedge member may be inserted between a wheel rim and a tubeless tire, and said hand grip pushed towards the wheel to leverage the wedge against the wheel rim and laterally displace the bead of said tire.

2. The device for breaking the bead of a tubeless tire of claim 1, wherein said runners follow the slope of the wedge fading into the distal edge such that the distal edge comprises a flat smooth surface.

3. The device for breaking the bead of a tubeless tire of claim 2, wherein each of said working surfaces is comprised of two lateral runners, at least one center runner and grooves between each of said runners.

4. The device for breaking the bead of a tubeless tire of claim 3, wherein said hand grip includes first and second hand plates; said first hand plate positioned at said proximal end of said hand grip adjacent said wedge member and said second hand plate positioned at said distal end of said hand grip for preventing a user's hand from slipping off the hand grip during use of said device.

5. The device for breaking the bead of a tubeless tire of claim 4, wherein said hand grip is further comprised of a textured surface to prevent slippage during use.

6. The device for breaking the bead of a tubeless tire of claim 5, wherein the said distal edge of said wedge member has two corners and said proximal rectangular end of said wedge member has four corners; and wherein said each of said corners are rounded.

7. The device for breaking the bead of a tubeless tire of claim 6, wherein said distal edge of said wedge member is slightly concave to facilitate insertion of said device between said wheel rim and said tire.

8. The device for breaking the bead of a tubeless tire of claim 7, wherein the working surfaces of the wedge are approximately 3 inches wide by 3 inches high.

9. The device for breaking the bead of a tubeless tire of claim 8, wherein said device is a solid single unit molded from vinyl plastic.

* * * * *